US012311706B2

(12) United States Patent
Bill (10) Patent No.: US 12,311,706 B2
(45) Date of Patent: May 27, 2025

(54) TYRE MONITOR

(71) Applicant: AIRBUS OPERATIONS LIMITED, Bristol (GB)

(72) Inventor: Andrew Bill, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 62 days.

(21) Appl. No.: 18/257,771

(22) PCT Filed: Dec. 15, 2021

(86) PCT No.: PCT/EP2021/085847
§ 371 (c)(1),
(2) Date: Jun. 15, 2023

(87) PCT Pub. No.: WO2022/129143
PCT Pub. Date: Jun. 23, 2022

(65) Prior Publication Data
US 2024/0051354 A1 Feb. 15, 2024

(30) Foreign Application Priority Data
Dec. 15, 2020 (GB) ..................................... 2019753

(51) Int. Cl.
*B60C 23/04* (2006.01)
(52) U.S. Cl.
CPC ...... *B60C 23/0479* (2013.01); *B60C 23/0498* (2013.01)
(58) Field of Classification Search
CPC .................. B60C 23/0479; B60C 23/0498
See application file for complete search history.

(56) References Cited

U.S. PATENT DOCUMENTS

| 7,775,096 | B2 | 8/2010 | Ivory et al. | |
|---|---|---|---|---|
| 8,742,912 | B2 | 6/2014 | Blanchard | |
| 9,776,462 | B1 | 10/2017 | Gray | |
| 10,035,387 | B2* | 7/2018 | Carresjö | B60C 23/0474 |
| 11,110,758 | B1 | 9/2021 | Dages et al. | |
| 2002/0148286 | A1* | 10/2002 | Losey | B60C 23/04985 |
| | | | | 73/146 |

(Continued)

FOREIGN PATENT DOCUMENTS

| CN | 106364263 | 2/2017 |
|---|---|---|
| CN | 107116968 | 9/2017 |

(Continued)

OTHER PUBLICATIONS

International Search Report and Written Opinion cited in PCT/EP2021/085845, mailed Apr. 20, 2022, 13 pages.

(Continued)

*Primary Examiner* — Mohamed Barakat
(74) *Attorney, Agent, or Firm* — Nixon & Vanderhye P.C.

(57) ABSTRACT

A tire monitor 11 includes a sensor device 12 arranged to detect an operating parameter of a tire and a protective housing 14 for the device, the device being retained on a ring 15 having spaced end portions 16a, 16b, the ring being resiliently radially biased. The provision of a retaining ring facilitates installation of the tire monitor within a tire assembly, so that the sensor device can directly monitor the operating parameter of the tire. The protective housing protects the sensor device from impact, vibration and temperature extremes.

19 Claims, 7 Drawing Sheets

(56) References Cited

U.S. PATENT DOCUMENTS

| | | | |
|---|---|---|---|
| 2003/0154007 A1 | 8/2003 | Evans et al. | |
| 2004/0154388 A1 | 8/2004 | Wilson et al. | |
| 2004/0182146 A1 | 9/2004 | Wilson | |
| 2005/0251306 A1* | 11/2005 | Gowan | G01P 3/443 701/71 |
| 2008/0144985 A1* | 6/2008 | Joki | F16C 41/007 301/109 |
| 2009/0038414 A1 | 2/2009 | Ozaki et al. | |
| 2013/0312509 A1 | 11/2013 | Solomon et al. | |
| 2013/0342341 A1 | 12/2013 | Simmerman et al. | |
| 2014/0150542 A1* | 6/2014 | Townsend | G01M 17/02 73/146 |
| 2015/0153250 A1 | 6/2015 | Yeom | |
| 2016/0334209 A1 | 11/2016 | Linson | |
| 2019/0329809 A1 | 10/2019 | Mackay | |
| 2020/0122529 A1 | 4/2020 | Skjermo et al. | |
| 2020/0290411 A1* | 9/2020 | Bickard | B60C 23/0488 |

FOREIGN PATENT DOCUMENTS

| | | |
|---|---|---|
| CN | 107160951 | 9/2017 |
| CN | 110920632 | 3/2020 |
| DE | 10 2007 010 782 | 2/2008 |
| DE | 10 2008 060 542 | 6/2010 |
| DE | 10 2010 016 378 | 10/2011 |
| DE | 10 2010 037 597 | 3/2012 |
| EP | 3 118 030 | 1/2017 |
| EP | 3 862 197 | 8/2021 |
| GB | 2461928 | 1/2010 |
| JP | 5967307 | 5/1984 |
| JP | 2004-284396 | 10/2004 |
| JP | 4198817 | 12/2008 |
| JP | 4735079 | 7/2011 |
| KR | 20080035073 | 4/2008 |
| WO | 01/54955 | 8/2001 |

OTHER PUBLICATIONS

Combined Search and Examination Report cited in GB2019750.5 mailed May 20, 2021, 7 pages.
International Search Report and Written Opinion cited in PCT/EP2021/085847, mailed May 2, 2022, 12 pages.
Combined Search and Examination Report cited in GB2019753.9 mailed May 20, 2021, 7 pages.
International Search Report and Written Opinion cited in PCT/EP2021/085849, mailed May 2, 2022, 14 pages.
International Search Report and Written Opinion cited in PCT/EP2021/086080, mailed Apr. 20, 2022, 15 pages.
Combined Search and Examination Report cited in GB2019868.5 mailed May 11, 2021, 7 pages.
International Search Report and Written Opinion cited in PCT/EP2021/086082, mailed May 2, 2022, 15 pages.
Combined Search and Examination Report cited in GB2019869.3 mailed May 17, 2021, 8 pages.
Office Action for U.S. Appl. No. 18/257,823, 29 pages, dated Sep. 26, 2024.

* cited by examiner

TYRE MONITOR

RELATED APPLICATIONS

This application is the U.S. national phase of International Application No. PCT/EP2021/085847 filed Dec. 15, 2021, which designated the U.S. and claims priority to United Kingdom patent application GB 2019753.9, filed Dec. 15, 2020, the entire contents of each of which are hereby incorporated by reference.

FIELD OF TECHNOLOGY

This invention relates to a device arranged to monitor the pressure of a tyre, such as an aircraft tyre. The invention also relates to a tyre including a monitoring device and to an aircraft incorporating a tyre monitoring device. The invention also concerns an aircraft including multiple such tyre monitoring devices, and a kit of parts including such a tyre monitoring device. The invention further relates to a method of installing a tyre monitor.

BACKGROUND

Checking tyre pressure is an important part of the maintenance of an aircraft. Tyre pressures should be maintained within a range of predetermined values to ensure that a tyre performs as intended. The benefits of proper inflation of aircraft tyres are well known. Under inflation produces uneven tread wear and shortens tire life due to excessive flex heating. It is imperative that the pressure of aircraft tyres is monitored regularly and frequently.

Currently, many such checks of aircraft wheel assembly properties are performed manually by using, for example, a manometer or other pressure gauge. Automated systems exist for monitoring tire pressure, but these systems require a pressure sensor to be permanently installed on a wheel in a manner specific to the particular design of the wheel. For instance, the wheel must typically include a port to accommodate the sensor, and possibly also a counterweight feature.

A problem which may be encountered with mounting the pressure sensor on the wheel is that the aircraft wheel is a hostile environment, subjected to the elements and to debris on the runway and hence may become damaged in use.

BRIEF SUMMARY OF THE TECHNOLOGY

The invention provides a tyre monitor comprising a sensor device arranged to detect an operating parameter of a tyre and a protective housing for the device, the device being retained on a ring having spaced end portions, the ring being resiliently radially biased. The provision of a retaining ring facilitates installation of the tyre monitor within a tyre assembly, so that the sensor device can directly monitor the operating parameter of the tyre. The protective housing protects the sensor device from impact, vibration and temperature extremes.

Preferably, the housing comprises an elastic material that is resiliently flexible. Suitable materials are: silicone rubber, natural rubber, polyurethane, neoprene rubber, a fluoropolymer elastomer, a nitrile rubber, a butyl rubber, a synthetic rubber, a thermoplastic elastomer; and any combination thereof.

Preferably, the sensor device comprises a pressure sensor for measuring the internal pressure of a tyre. The tyre monitor is able to be used inside a tyre assembly, and so the pressure sensor can directly monitor the gas pressure within the tyre.

Advantageously, a wireless communication interface is provided and arranged to communicate with a device external to the sensor device.

Preferably, the sensor device also comprises a temperature sensor arranged to measure a temperature within a tyre. The temperature sensor can directly measure the temperature of gas within the tyre assembly.

A memory unit may be provided for storing data, together with a processor arranged to record in the memory unit data from a sensor.

A time source may also be provided and arranged such that data recorded in the memory unit includes an indication of the time of the reading from the sensor.

The tyre monitor preferably further comprises a power supply for the sensor device. This may be arranged on the retaining ring at a location remote from the sensor device.

A counterweight may be provided on the retaining ring, to provide balance to the wheel. The counterweight may take the form of the aforementioned power supply.

At least one resiliently flexible damper may be provided on the retaining ring, to dampen vibration and impact. Preferably, a damper is provided at each end portion of the ring, and these may be used as hand grips so that a user may grip and manipulate the ring.

The invention further provides a wheel assembly including such a tyre monitor.

The invention further provides a method of installing the tyre monitor in a tyre, comprising moving the end portions of the ring against the bias of the ring, introducing the monitor into the interior of a tyre and releasing the end portions. Such a process is simple and intuitive.

The invention further provides a kit of parts comprising the tyre monitor and a reader external to the tyre monitor, wherein the sensor device and the reader are configured to communicate with each other. The kit of parts may include a plurality of such tyre monitors.

The invention further provides an aircraft including a wheel assembly and the tyre monitor. Preferably, a plurality of wheel assemblies and a plurality of tyre monitors are provided, with each tyre monitor being associated with a different respective wheel assembly.

The invention provides a method of monitoring an operating parameter of a tyre on an aircraft, the method comprising utilising the tyre monitor to detect the operating parameter of the tyre.

BRIEF DESCRIPTION OF THE DRAWINGS

The invention will now be described, by way of example, with reference to the accompanying drawings in which.

DETAILED DESCRIPTION OF EMBODIMENTS OF THE TECHNOLOGY

In examples described herein, references to "aircraft" include all kinds of aircraft, such as fixed wing military or commercial aircraft; unmanned aerial vehicles (UAVs); and rotary wing aircraft, such as helicopters.

It should be noted that the components shown in the drawings are not necessarily shown to scale.

Figure 1:
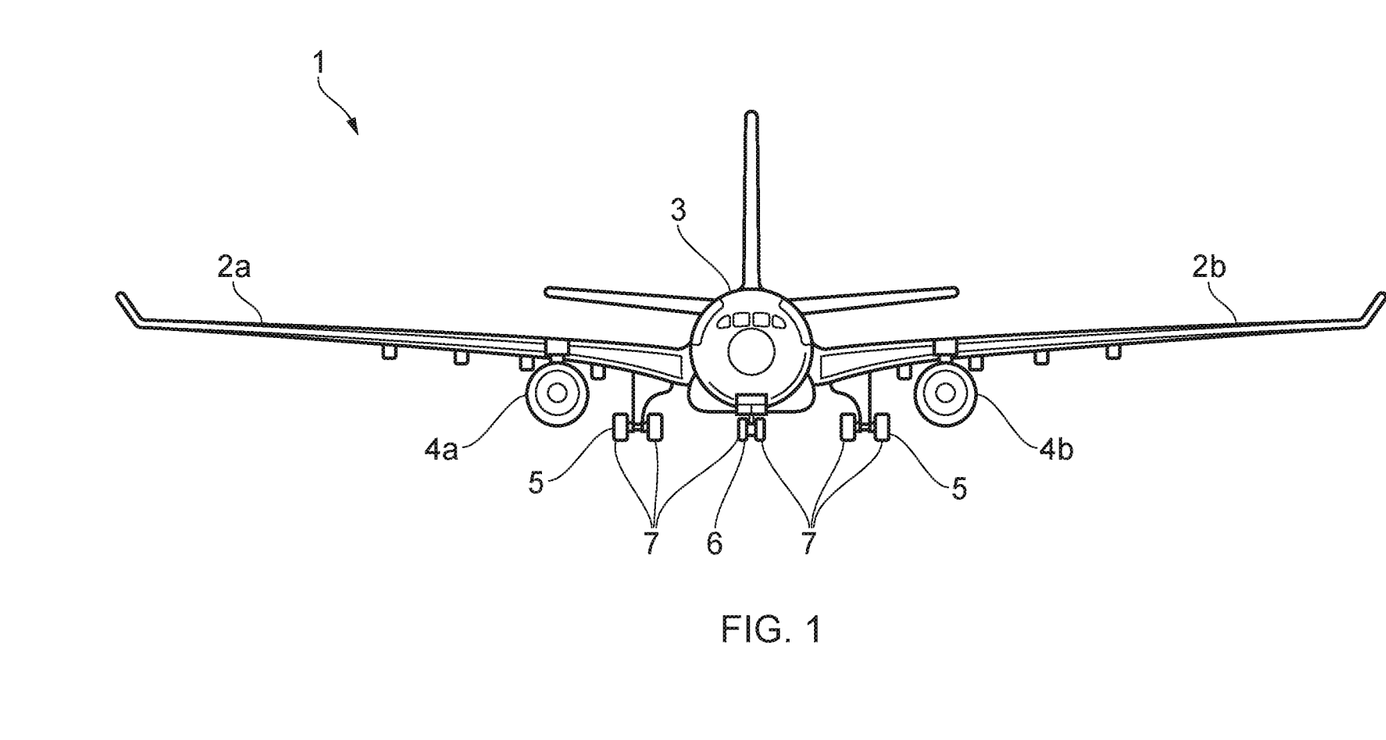
FIG. 1 is a front view of an aircraft.

With reference to FIG. 1, an aircraft indicated generally by the reference numeral 1 comprises a pair of wings 2a, 2b and a fuselage 3. The wings 2a, 2b each carry an engine 4a, 4b respectively. The aircraft 1 is supported on the ground by sets of landing gear assemblies comprising a main landing gear (MLG) 5 and a nose landing gear (NLG) 6. The landing gear assemblies comprise pairs of wheel assemblies 7 which are shown in FIG. 1 in contact with the ground (e.g. a runway). This aircraft has six wheel assemblies in total; four wheel assemblies as part of the MLG 5 and two wheel assemblies as part of the nose landing gear NLG 6. The aircraft therefore needs six tyre monitoring devices. Other models of aircraft may have different numbers of wheel assemblies and hence different numbers of tyre monitoring devices.

Figure 2:
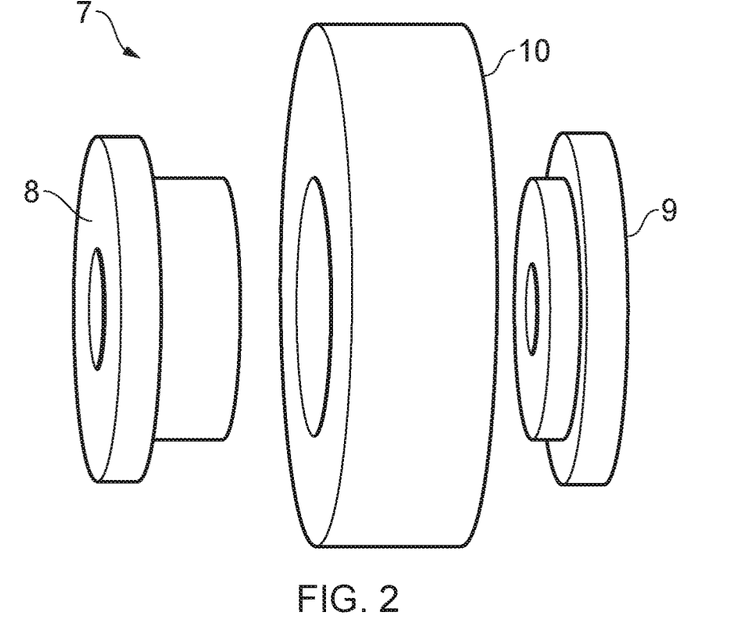
FIG. 2 is a side perspective view of parts of a wheel of the aircraft of FIG. 1.

FIG. 2 is a simple diagram showing the basic construction of an aircraft wheel assembly 7. The wheel assembly 7 comprises an inboard wheel rim 8, an outboard wheel rim 9 and a tyre 10. The inboard wheel rim 8 houses the brake assembly (not shown) for the wheel assembly 7. The outboard wheel rim 9 includes a valve (also not shown) for inflating the tyre 10. To construct the wheel assembly 7, the wheel rims 8, 9 are bolted together with the tyre 10 in-between which is then pressurised via the valve, usually with nitrogen.

Figure 3:
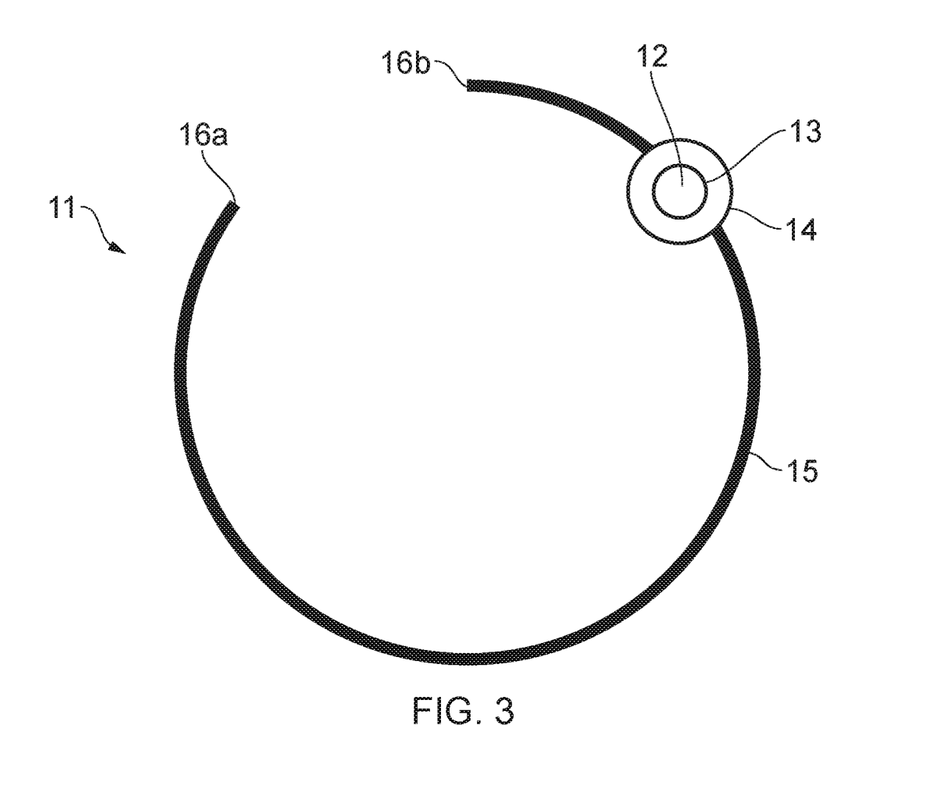
FIG. 3 is a schematic view of a tyre monitor constructed according to the invention.

In accordance with the invention, a tyre monitor 11, as shown in FIG. 3, is provided inside the tyre 10. The tyre monitor 11 comprises a tyre pressure sensor device 12 in a casing 13, the casing being at least partially surrounded by a protective, resiliently flexible housing 14. The housing 14 is formed from a thick layer of silicone rubber that is able to withstand the extremes of temperature that are experienced in the tyre (typically between −50° C. to 275° C.). The housing 14 serves to protect the contents of the casing 13 from impact and vibration, and also protects the tyre 10 and rims 8, 9 of the wheel assembly 7 from impact with the casing. The housing 14 also serves to thermally decouple the tyre pressure sensor device 12 from the rims 8, 9 and/or tyre 10 of the wheel assembly, so that any readings taken by the device are not significantly influenced by the temperature of these parts of the wheel. The housing 14 contains an opening or vent (not shown), as does the casing 13. Thus, in use, the tyre pressure sensor device 12 inside the casing 13 can sense the gas pressure and/or temperature of the monitor's surroundings.

The flexible housing 14 is attached to a retaining ring 15 that has two spaced apart end portions 16a, 16b. The housing 14 may be attached to the ring 15 by use of a suitable adhesive (e.g. a curable epoxy resin); by chemical bonding using chemical modifiers in the rubber; or by moulding and curing the housing on the ring. The housing may also be attached to the ring 15 by means of a suitable fastener or clamping mechanism. The retaining ring 15 is formed of steel and is resiliently biased, either radially outwardly or inwardly. In this example, the ring 15 is biased radially outwardly such that the end portions 16a, 16b have a tendency to move away from each other. The retaining ring 15 is coated with a protective silicone rubber coating.

The end portions 16a, 16b of the ring are intended to be gripped by an installation technician when installing the tyre monitor 11. The rubber coating on the ring may be thicker at the end portions 16a, 16b, and shaped to form hand grips to assist the technician. The technician holds the end portions 16a, 16b, and urges them against the direction of bias—in this embodiment, the technician pushes the end portions towards each other. Then, the technician places the tyre monitor 11 inside the tyre 10 and releases the end portions 16a, 16b so that the ring 15 expands into the tyre and resumes its initial shape. The wheel rim portions 8, 9 are then assembled on the tyre 10 and bolted together, and the tyre is pressurised. Alternatively, the tyre monitor 11 may be installed when the tyre 10 has been fitted to one of the rims 8 or 9, prior to the other rim being fitted. Thus, the tyre monitor 11 of the present invention is simple and quick to install, requiring no special tools or fasteners or specialist operator training.

Figure 4:
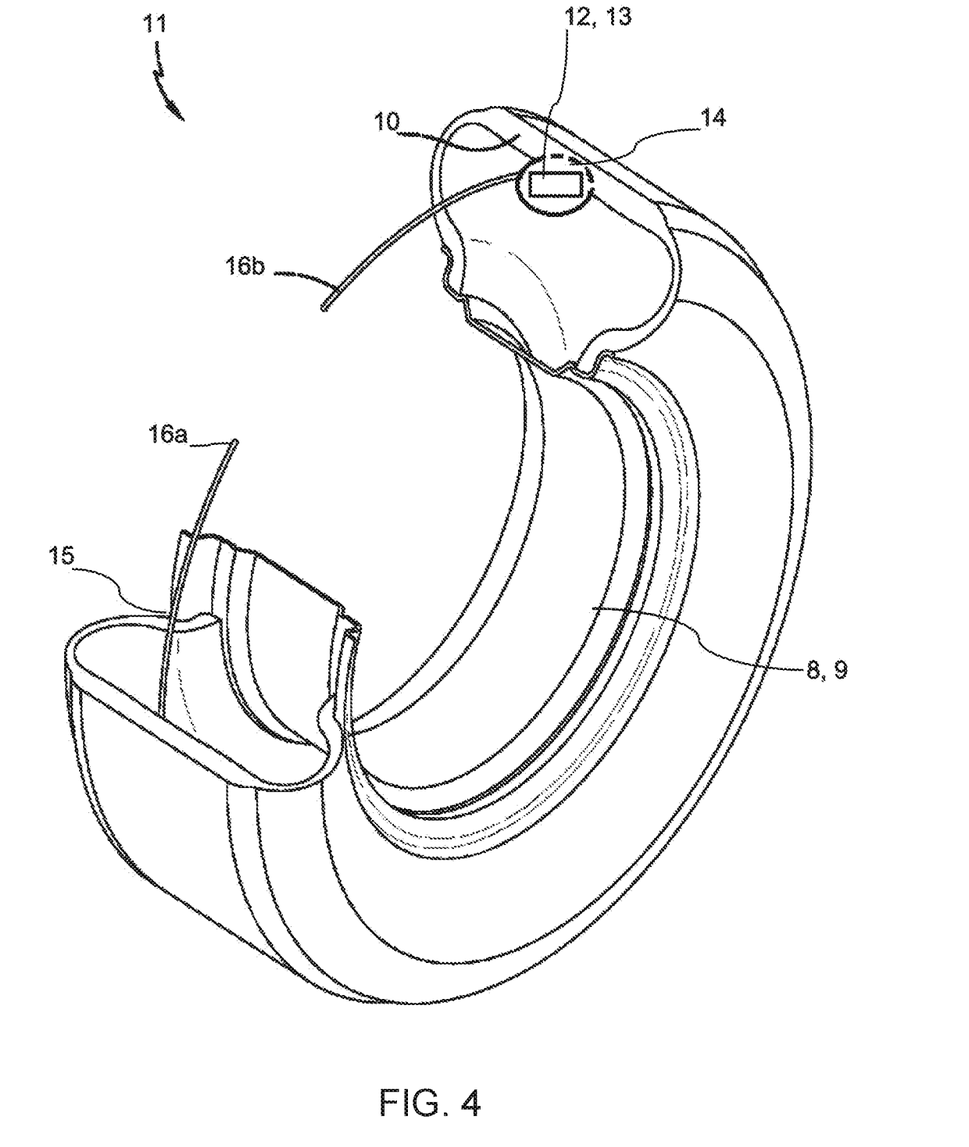
FIG. 4 is a perspective view of a tyre incorporating the tyre monitor of FIG. 3.

FIG. 4 shows the tyre monitor 11 of FIG. 3 in situ. In this embodiment, the ring 15 is biased radially outwardly so that the flexible, resilient housing 14 is in contact with the inner surface of the tyre's circumference i.e. at its running surface. In use, the housing 14 and retaining ring 15 flex with movement of the tyre 10 on the ground. The tyre monitor 11 is sufficiently flexible to allow the tyre 10 to flex and deflect freely, so that the performance of the tyre on the ground is not compromised.

Alternatively, the tyre monitor 11 of FIG. 3 may have a ring that is biased radially inwardly. In this case, the installation sequence is just as simple and is as follows: the tyre 10 is fitted to one of the rims 8 or 9; the technician grips the end portions 16a, 16b and urges them away from each other; the technician places the tyre monitor 11 into the tyre and releases the ends, so that the retaining ring 15 shrinks onto the rim; the other rim is then introduced; and then the rims are bolted together and the tyre is pressurised.

Figure 5:
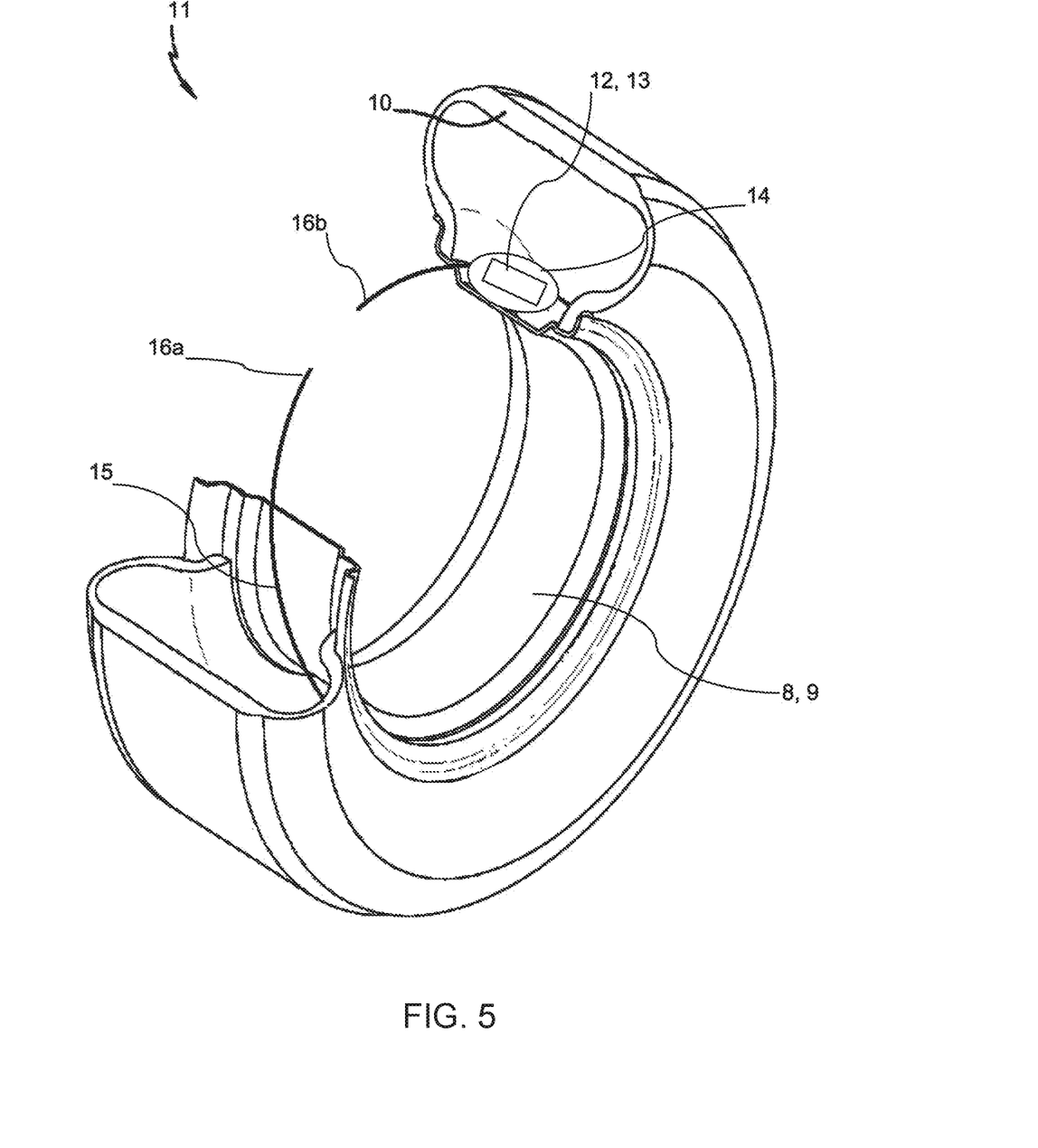
FIG. 5 is a is a perspective view of a tyre incorporating the tyre monitor of FIG. 3 in an alternative configuration.

FIG. 5 shows this configuration of the tyre monitor 11 in situ. In this embodiment, the retaining ring 15 is biased radially inwardly so that the flexible, resilient housing 14 is in contact with the rims 8, 9 of the wheel assembly 7. In use, the housing 14 and retaining ring 15 absorb vibrations of the rim 8, 9. The spring bias of the ring 15 may be arranged so that the housing 14 rests lightly on the rims 8, 9, so that the tyre monitor 11 is free to rotate with respect to the wheel assembly 7. Centripetal forces experienced by the retaining ring 15 in use may urge it radially outwardly and hence move the housing 14 out of contact with the rim 8, 9.

Figure 6:
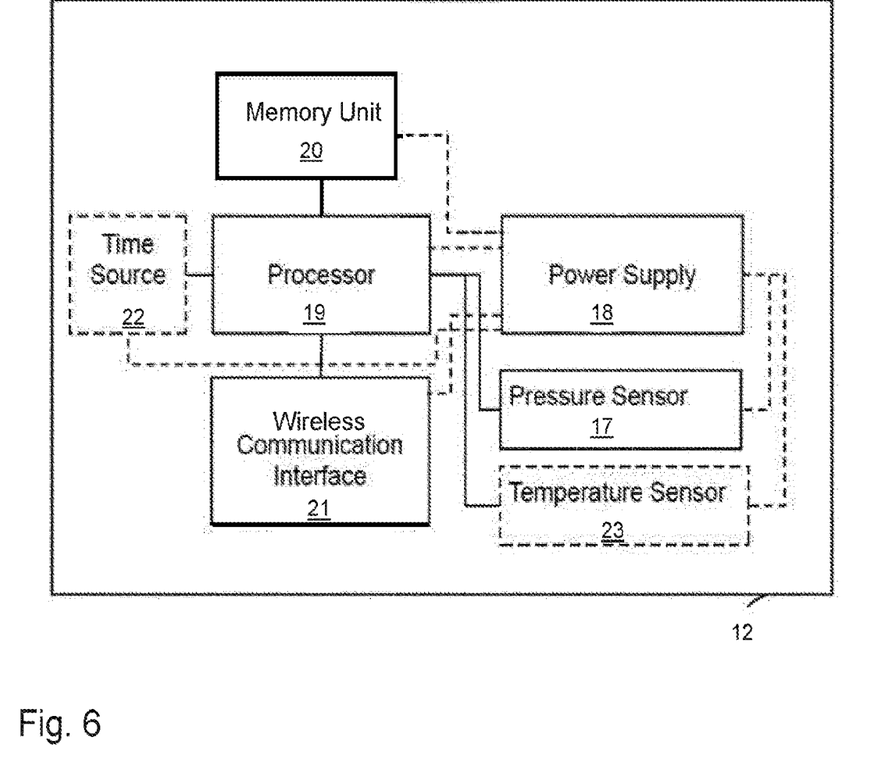
FIG. 6 is a schematic diagram of a tyre pressure sensing device of the tyre monitor of FIG. 3.

The tyre pressure sensor device 12 of the tyre monitor 11 is shown schematically in FIG. 6. The device 12 comprises the following components: a pressure sensor 17; a power supply 18; a processor 19; a memory unit 20; and a wireless communication interface 21. The device may optionally include one or both of the following components (shown in broken lines in this drawing): a time source 22; and a temperature sensor 23.

The pressure sensor 17 may be any suitable sensor for measuring gas pressure inside an aircraft tyre, for example a resistive sensor or a capacitive sensor. The pressure sensor 17 is connected to the processor 19 and provides signals to it indicative of the internal inflation pressure of the tyre. The processor 19 may be any suitable processing device, such as a microprocessor with one or more processing cores. In use, the processor 19 coordinates and controls the other components and may be operative to read and/or write computer program instructions and data from/to the memory unit 20. The processor 19 may be arranged to encrypt data for transmission.

In this example, the power supply 18 is a battery with power sufficient to run the tyre pressure sensor device 12 in normal operation for several years. In use, the device may spend much of its operational life in "sleep" or low power mode, with most of the components other than the processor 19 and wireless communication interface 21 powered off. This can conserve battery life. For example, the tyre pressure sensor device 12 may be by default in a low power mode, listening for a command to measure or report tyre pressure.

The memory unit 20 is connected to the processor 19 and is used to store computer program instructions for execution by the processor; and data, such as data from the pressure sensor 17 or data received over the wireless communication interface 21. The memory unit 20 can include non-volatile rewritable storage, such as flash memory which can retain data without requiring applied power. Alternatively, volatile storage, which is kept powered by the power supply 18, may be employed; or combinations of read-only and rewritable storage.

The memory unit 20 is configured to store a history of pressure readings sensed by the pressure sensor 17. The history may be stored for at least the maximum time between pressure measurements for tyre maintenance, such as for at least three days. This can ensure that enough history is held to provide details since the last maintenance tyre pressure reading, so that the history can be transferred for use in trend analysis, along with the current pressure measurement data. Longer periods of history may also be kept.

The wireless communication interface 21 is connected to the processor 19 and is used to both transmit data to, and receive data from, other devices within a tyre pressure sensor system, which is described in more detail later in the specification. The wireless communication interface 21 includes at least one transceiver. More than one transceiver may be provided, each using different wireless technology and/or arranged to transmit and receive over different ranges.

As mentioned above, the device may also include a temperature sensor 23 connected to the processor and arranged to take reading of the temperature of the gas inside the tyre directly. Data from the temperature sensor 23 may also be stored in the memory unit 20. The temperature sensor 23 may be any suitable sensor for measuring gas temperature within a tyre, such as a thermocouple. Knowing gas temperature enables direct temperature compensation of pressure measurements to be carried out—there is no need to wait for the wheels to cool.

Furthermore, the device may optionally include a time source 22, such as a counter or a real time clock. The time source 22 provides a value indicative of current time for indicating the time at which a measurement was taken; for example the processor 19 may cause a current value of the time source 22 to be associated with each pressure and/or temperature measurement when it is stored in the memory unit 20 for use as a time stamp.

Measurements of tyre pressure can be taken at regular intervals to obtain historical data of pressure without requiring operator input and stored with an associated time of measurement or time stamp. When the tire monitoring device also includes a temperature sensor, temperature data can also be stored along with the pressure data. A history of pressure/temperature pairs with an associated time stamp can therefore be built up over time. Such historical data can be used to improve the reliability of tyre pressure measurement and enable improved tyre maintenance.

As mentioned above, the wireless communication interface 21 is arranged to communicate data with other devices in a tyre pressure monitoring system. For example, the wireless communication interface 21 may be arranged to communicate with an indicator on its tyre arranged to provide indications to ground crew of the condition of that tyre. A suitable indicator would be a visual indicator such as a light signal arranged to emit light indicative of the tyre's condition—for example, a constant light, a flashing light, light of a first colour and/or a second colour. Other visual indicators are an LCD or e-ink display. An audible indicator such as a buzzer or speaker, may alternatively or additionally be provided.

Alternatively, the wireless communication devices of the tyres of an aircraft may be arranged to communicate with each other and to provide an output to a single indicator device. For example, there may be a light signal on the NLG, arranged to emit green light if all tyres are within an acceptable range of pressure values, but to emit red light if any one of the tyres requires maintenance or further checks. Such an arrangement reduces the need for ground crew to walk around to each wheel. Other visual or audible indicators may be provided on the NLG.

The wireless communication devices of the tyre assemblies may be in communication with a cockpit system to provide tyre pressure and/or temperature data to the pilots on the flight deck. Alternatively, or additionally, the wireless communication interfaces may be arranged to communicate with a handheld device, such as a tablet, smart phone or portable computer. Thus, ground crew can download data from one or more tyre pressure sensor devices, or even all of the tyre pressure sensor devices for analysis.

Figure 7:
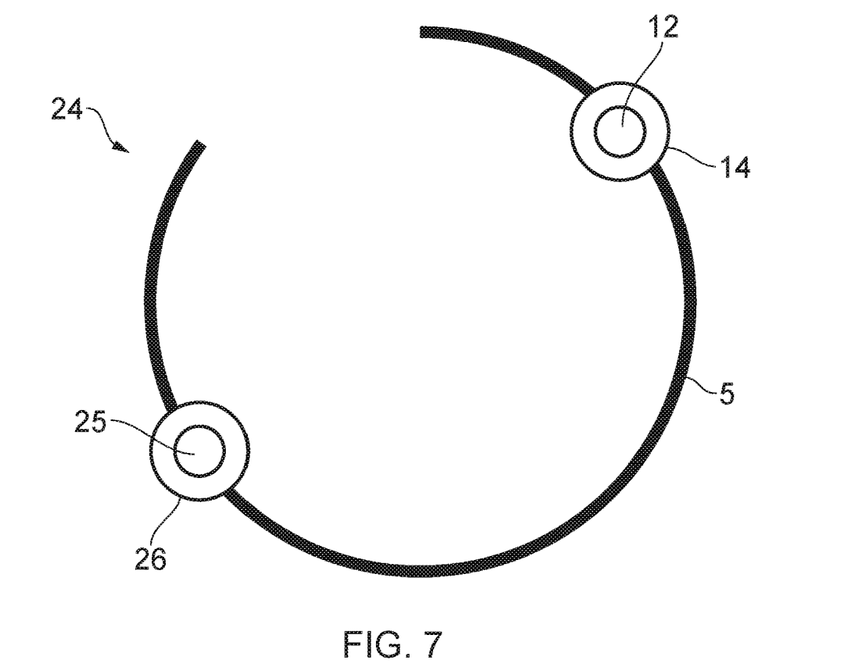
FIG. 7 is a schematic view of a tyre monitor constructed according to another embodiment of the invention.
Figure 8:
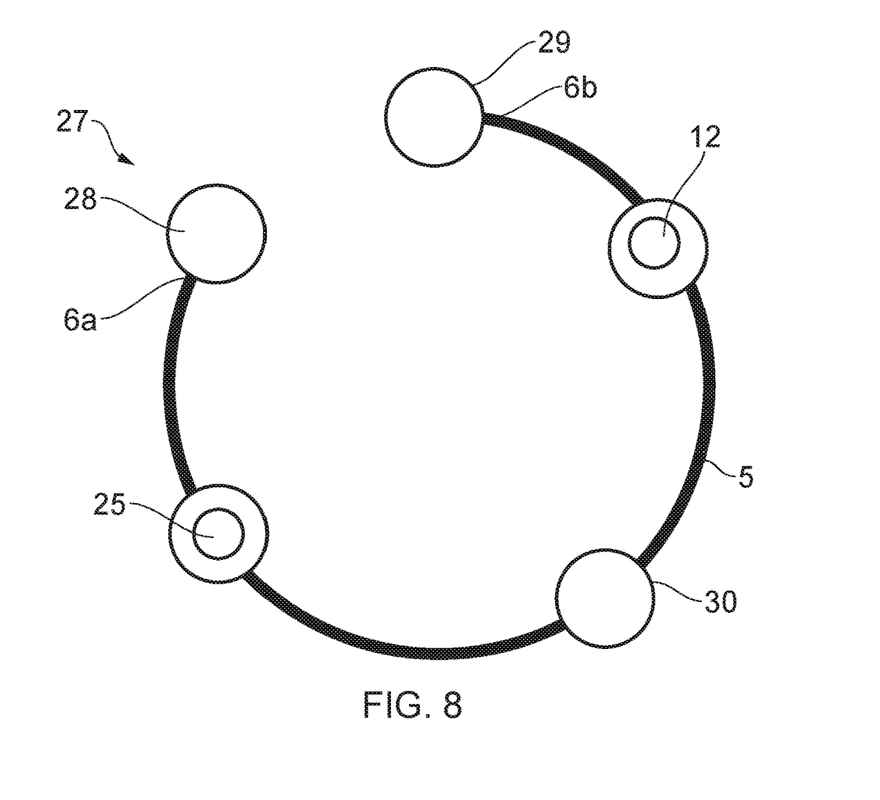
FIG. 8 is a schematic view of a tyre monitor constructed according to another embodiment of the invention.

FIGS. 7 and 8 illustrate alternative embodiments of the invention. In the embodiment of FIG. 7, the tyre monitor 24 comprises a tyre pressure sensing device 12 and a counterweight 25. The counterweight 25 is provided on the retaining ring 5, substantially diametrically opposite the tyre pressure sensor device 12. The counterweight 25 ensures that the wheel maintains balance in use. Out-of-balance wheels can cause maintenance problems, such as uneven tyre wear and airframe vibration. The counterweight 25 is covered by a resilient flexible housing 26 made of, for example, the same silicone rubber as is used for the housing 14 covering the tyre pressure sensor device 12. The housing 26 protects the tyre and rim from impact with the counterweight 25, and may also serve to dampen deflection and vibration experienced by the tyre monitor. As with the monitor shown in FIG. 4, the retaining ring 5 may be biased radially outwardly, so that the housings 14, 26 of the tyre pressure sensing device 12 and the counterweight 25 are urged towards the inner surface of the tyre. Alternatively, the ring 5 may be biased radially inwardly as with the monitor of FIG. 5, so that the housings 14, 26 contact the rim of the wheel assembly. The method of installing this embodiment of the tyre monitor is the same as that described for the monitor of FIG. 3.

The counterweight 25 may comprise a secondary tyre monitor, similar to the primary monitor 12. Such an arrangement may provide greater reliability. Alternatively, the counterweight 25 may contain other sensing devices, such as an accelerometer arranged to measure aircraft acceleration and deceleration and to record so-called hard landings.

Alternatively, or additionally, the counterweight 25 may include the power supply 18 for the or each sensor. In this embodiment, power is transmitted from the power supply 18 to the tyre pressure sensing device 12 by means of conductors embedded in, or attached to, the retaining ring 5. Alternatively, the ring itself may form the electrical conductor between the power supply 18 and the rest of the tyre pressure sensing device 12. An advantage of this configuration is that the power supply, e.g. a battery, may be replaced without having to remove the tyre pressure sensor device from its casing 13.

In the embodiment of FIG. 8, the tyre monitor 27 includes the tyre pressure sensing device 12 and counterweight 25 as before, and also a plurality of dampers 28, 29, 30 on the retaining ring 5. The dampers 28-30 are formed from a resiliently flexible material, such as the silicone rubber used for the housing 14. They are arranged on the ring 5 in a weight-balanced configuration, so as not to detrimentally effect the balance of the aircraft wheel assembly. The dampers 28-30 are arranged to dampen vibration and to absorb impact experienced by the tyre pressure sensing device 12 and any components in the counterweight 25 in use.

Two of the dampers 28, 29 may be provided at the respective end portions 6a, 6b of the retaining ring 5. These dampers 28, 29 serve multiple purposes: to dampen vibration; to protect the tyre 10 and rim 8,9 from the ends of the ring 6a, 6b; and to provide useful hand grips so that a technician can easy pull or push the end portions of the ring when installing or removing the tyre monitor. To this end, the dampers may be shaped to provide a comfortable hand grip for the user. The method of installing this embodiment of the tyre monitor is the same as that described for the monitor of FIG. 3.

Figure 9:
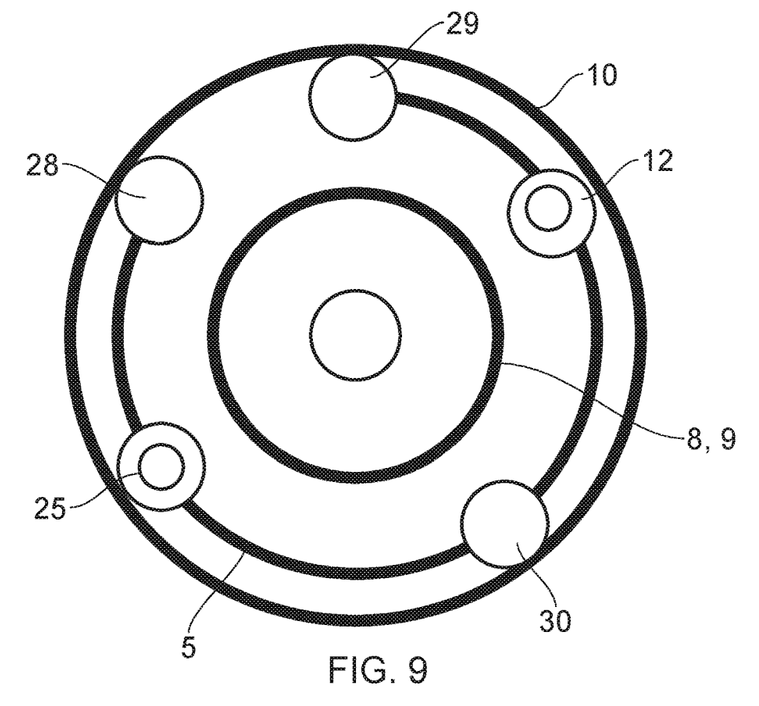
FIG. 9 is a side schematic view of a tyre incorporating the tyre monitor of FIG. 8.
Figure 10:
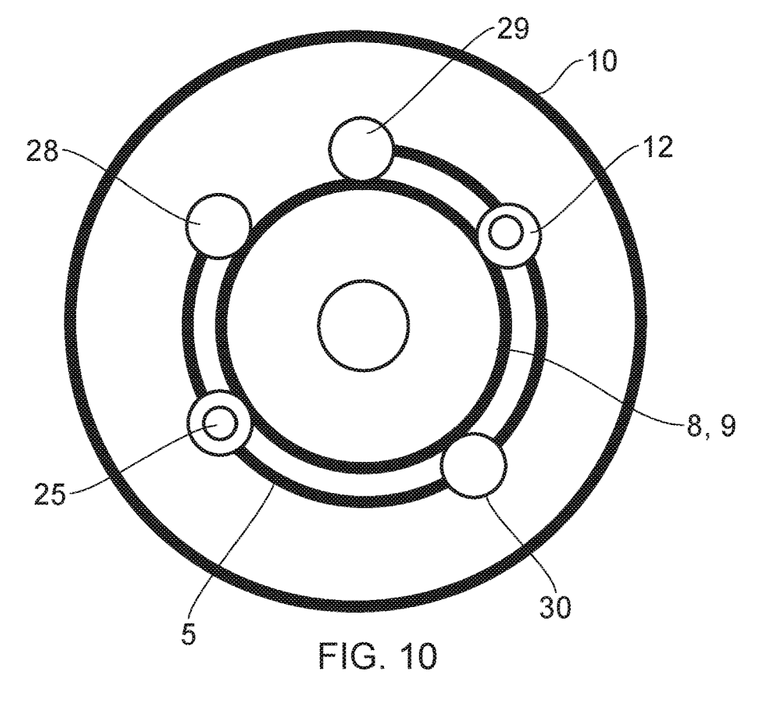
FIG. 10 is a side schematic view of a tyre incorporating the tyre monitor of FIG. 8 in an alternative configuration.

FIGS. 9 and 10 show the tyre monitor 27 of FIG. 8 installed in a tyre 10. In the example shown in FIG. 9, the tyre monitor 27 is configured so that the ring 5 is biased outwardly. The tyre monitor 27 is urged against the inner surface of the tyre's running surface. The dampers 28-30 protect the tyre pressure sensing device 12 from impacts caused by the tyre 10 hitting the ground and rolling along it. FIG. 10 shows the tyre monitor 27 configured so that the retaining ring 5 is biased inwardly. The tyre monitor 27 is urged against the circumference of the rim 8, 9. The dampers 28-30 protect the tyre pressure sensing device from vibration of the rim in use.

Further variations may be made without departing from the scope of the invention. For example, multiple sensors may be provided on the retaining ring. Dampers may be provided in any suitable number and configuration, or omitted altogether. Each housing and/or damper may be arranged to have more material on the side that contacts part of the wheel in use: for example, if the ring is biased outwardly, the housing or damper may be thicker on its outwardly-facing portion. Each housing and/or damper may be shaped to conform to the shape of the part of the wheel it contacts in use. A housing or damper may have different Shore hardness values in different regions: for example, a housing may be arranged to have greater flexibility on its outer surface, but be less flexible in the central region around the casing. Suitable alternative materials for the casing are: natural rubber, polyurethane, neoprene, fluoropolymer elastomer, nitrile rubber, butyl rubber, synthetic rubber, a thermoplastic elastomer, and any combination thereof.

The housing may contain further chambers or vents to allow heat to dissipate from the processor. A door or flap may be provided in the casing to give access to the sensor device.

The retaining ring need not be of steel: other robust yet flexible materials could be employed, such as carbon fibre composite. The retaining ring could also be used as an antenna for the wireless communication interface. The retaining ring may be arranged to be more flexible in the embodiments that are biased outwardly towards the tyre (that need to tolerate tyre deflection), than in the embodiments arranged to contact the rim.

The power supply of the tyre pressure sensing device may include a power harvesting system, in which the deflections and vibrations experienced by the tyre monitor are used to charge a capacitor or battery which is then used to power the device. Further variations will be apparent to the skilled person.

The invention claimed is:

1. A tire monitor comprising:
   a sensor device arranged to detect an operating parameter of a tire,
   a protective housing configured to house the sensor device, and
   a resiliently radially biased ring attached to the protective housing and sensor device, the ring being configured to be mounted within a tire such that the ring is resiliently radially biased adjacent an inner circumferential surface of the tire or an outer circumferential surface of a rim supporting the tire,
   wherein the ring includes spaced end portions separated by a gap aligned with a circumference of the ring, wherein the gap is present while the ring is mounted within the tire.

2. The tire monitor as claimed in claim 1, in which the protective housing comprises an elastic material that is resiliently flexible.

3. The tire monitor as claimed in claim 2, wherein the elastic material comprises a polymer selected from the group consisting of: a silicone rubber, a natural rubber, a polyurethane, a neoprene rubber, a fluoropolymer elastomer, a nitrile rubber, a butyl rubber, a synthetic rubber, a thermoplastic elastomer, and any combination thereof.

4. The tire monitor as claimed in claim 1, in which the sensor device comprises a pressure sensor configured to measure an internal pressure of the tire.

5. The tire monitor as claimed in claim 4, further comprising a wireless communication interface arranged to communicate with a device external to the sensor device.

6. The tire monitor as claimed in claim 4, further comprising a temperature sensor arranged to measure a temperature within the tire.

7. The tire monitor as claimed in claim 4, further comprising a memory unit configured to store data and a processor arranged to record in the memory unit data from the sensor device.

8. The tire monitor as claimed in claim 7, further comprising a time source arranged such that the data recorded in the memory unit includes an indication of a time of a reading from the sensor device.

9. The tire monitor as claimed in claim 1, further comprising a power supply for the sensor device.

10. The tire monitor as claimed in claim 9, in which the power supply is arranged on the ring at a location spaced from the sensor device.

11. The tire monitor as claimed in claim 1, further comprising a counterweight on the ring.

12. The tire monitor as claimed in claim 1, further comprising at least one resiliently flexible damper on the ring.

13. The tire monitor as claimed in claim 12, in which the damper is provided at each of the end portions of the ring.

14. A wheel assembly including a tire monitor as claimed in claim 1.

15. A kit of parts comprising:
a tire monitor as claimed in claim 1, and
a reader external to the tire monitor, wherein the sensor device is configured to communicate with the reader.

16. A kit of parts as claimed in claim 15, including multiple ones of the tire monitor.

17. An aircraft including a wheel assembly and a tire monitor as claimed in claim 1.

18. An aircraft including:
a plurality of wheel assemblies, and
a plurality of tire monitors as claimed in claim 1,
wherein each of the tire monitors is associated with a different respective wheel assembly.

19. A method of installing a tire monitor including a sensor device arranged to detect an operating parameter of a tire and a protective housing for the device, wherein the sensor device is retained on a ring having spaced end portions and the ring is resiliently radially biased, the method comprising:
moving the end portions of the ring against the bias of the ring,
introducing the monitor into an interior of a tire,
releasing the end portions, and
by the releasing of the end portions causing the ring either to expand circumferentially in the tire to be resiliently biased against an inner circumferential surface of the tire or to contract circumferentially to be biased against an outer circumferential surface of a rim supporting the tire,
wherein the end portions of the ring are separated by a gap after the end portions are released and the ring is resiliently biased against the inner circumferential surface of the tire or biased against the outer circumferential surface of the rim.

* * * * *